Dec. 25, 1956　　　T. D. WAUGH ET AL　　　2,775,055
FISHING LURES AND METHOD FOR PRODUCING THE SAME
Filed Sept. 17, 1951　　　　　　　　　　　2 Sheets-Sheet 1

*INVENTOR.*
Richard C. Waugh
Thomas D. Waugh
BY
Lampher + Van Valkenburgh
ATTORNEYS Dec. 25, 1956 T. D. WAUGH ET AL 2,775,055
FISHING LURES AND METHOD FOR PRODUCING THE SAME
Filed Sept. 17, 1951 2 Sheets-Sheet 2

INVENTORS.
Richard C. Waugh
Thomas D. Waugh
BY
Horace B. Van Valkenburgh
ATTORNEY United States Patent Office 2,775,055
Patented Dec. 25, 1956

2,775,055
FISHING LURES AND METHOD FOR PRODUCING THE SAME
Thomas D. Waugh and Richard C. Waugh, Boulder, Colo.
Application September 17, 1951, Serial No. 246,934
8 Claims. (Cl. 43—42.25)

This invention relates to fishing lures, and more particularly to artificial fishing flies, and to methods of producing the same.

In attempts to capture the piscatorial inhabitant of streams, lakes and rivers, the devotees of the art of Izaak Walton have used many artifacts, including artificial flies which simulate the appearance of a food object, such as a fly or other insect, which might naturally be floating on or carried within the water. The artificial fly has embodied therein a barbed hook, which in some instances is hidden or camouflaged but which becomes an instrument for the attachment of the fishing line to a hungry, voracious or perhaps just a plainly curious fish, the fish usually attempting to engulf the fly at one hearty lunge. The result is a battle, primarily involving skill, experience and endurance, between the angler on one end of the line and the fish on the other. For such purposes, artificial flies have ranged widely in appearance and color, as from subdued and somber tones to a variety of bright colors and flashing appearance, all calculated to activate the interest of the fish, further depending, of course, upon whether the angler—through experience and wisdom or perhaps only fortuitously—selects the correct fly to appeal to the specific fish at the particular time involved. Such artificial flies have generally been produced by wrapping bird feathers or animal hair around the shank of a fish hook and attaching the same thereto by a silk or nylon thread wrapping. Many of the feathers and hair used for artificial flies are highly expensive, while fly-tying is generally considered an art requiring considerable dexterity and skill, including unusually nimble fingers. Thus, while the variety of material and coloring available for artificial flies is great, the necessity for hand operations, even when assisted by sometimes relatively complicated jigs and fixtures, coupled with the cost of the materials generally used, causes the cost of artificial flies to constitute a considerable item of expense for the angler.

Among the objects of the present invention are to produce a novel artificial fly; to provide such a fly which may be made of comparatively inexpensive materials; to provide such a fly which may be made in a relatively simple form, such as that of a "nymph," or in more complicated form; to provide such a fly which may vary considerably in appearance, color, shape, form and similar characteristics; to provide such a fly which may be made in a combination or in a blend of two or more different colors, either in comparatively simple or in more complicated form; to provide a method of making such artificial flies which may be carried out by very simple hand operations, or substantially or completely by machine; to provide such a method which does not require unduly complicated or highly expensive machinery; to provide such a method by which artificial fishing flies may be produced in comparatively large numbers at a relatively rapid rate, and therefore at a lower cost than by hand operations; to provide such a method which may include only a few simple steps to produce a simple fly, such as a "nymph"; to provide such a method which may include additional steps to produce more complicated flies, but which steps do not add unduly to the cost; to provide such a method in which the procedural steps involved may be varied sufficiently to accomplish the desired result; to provide such a method by which the cost of attaching the materials to the fish hook is greatly reduced; and to provide such a method which will achieve substantially uniformly reproducible results.

Additional object and the novel features of this invention will become apparent from the description which follows, taken in connection with the accompanying drawing, in which.

Figure 1:
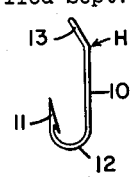
Fig. 1 is a side view of a fish hook which is to be used in making an artificial fly, in accordance with this invention.
Figure 4:
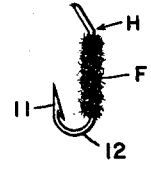
Fig. 4 is a side view of the hook of Fig. 3, after the floc or fibers have engaged the adhesive and the adhesive is set, the result being a comparatively simple artificial fly, which may be termed a "nymph"

An artificial fishing fly of this invention, as illustrated in Fig. 4, may comprise a metal hook H which is characterized by having a floc F or plurality of relatively short fibers of comparatively small diameter, predominantly extending substantially laterally from a predetermined portion of the metal hook and attached thereto by an adhesive. As shown in Fig. 1, the hook H includes a shank 10 (to which the floc F of Fig. 4 is attached), a barber bill 11 on one end of a curvilinear or bent portion 12 which extends from shank 10, and at the opposite end of the shank an eye 13 for attachment of a leader or the like. The size of the fish hook may, of course, be varied as well as the size, shape and proportions of its various parts.

Figure 5:
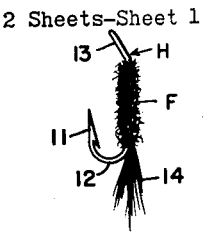
Fig. 5 is a side view of a slightly more complicated artificial fly, in which a plurality of relatively long fibers have been mounted on the hook by adhesive, prior to an additional adhesive coating by which short fibers or floc have been attached thereto, in substantially the same manner as in the artificial fly in Fig. 4.

A comparatively more complicated artificial fly, although a correspondingly inexpensive one, may be similar to that shown in Fig. 5, in which a plurality of long fibers 14 are attached to the shank 10 of the fish hook prior to the attachment of floc F, the fibers 14 extending longitudinally of and beyond the shank. The floc F need not be expensive or rare bird feathers or animal hair, but instead may be comparatively inexpensive fibers, such as a natural fiber, one example of the same being human hair, or a synthetic fiber, examples of the same being cellulose acetate, rayon and the like. The floc F may have any desired color or a mixture or combination of colors, the mixture being obtained by utilizing floc composed of two or more different colors, and the latter by attaching floc of one color or mixture of colors to a predetermined portion of the fish hook, and then attaching floc of a different color or mixture of colors to another predetermined portion of the fish hook, and then attaching floc of a different color or mixture of colors to another predetermined portion of the fish hook, as in the manner described later. The floc consists of fibers which are preferably capable of acquiring an electrostatic charge, for reasons explained later, and preferably consists of fibers on the order of the equipment of ten denier or less in diameter, and on the order of one-thirty-second inch to one-fourth inch in length. The cross section of the fibers need not be circular, since the fibers may be oval or have any other cross-sectional shape, either natural or resulting from the manner of producing the fibers, so that the term "diameter" as used herein, does not necessarily connote circular cross-section.

Figure 2:
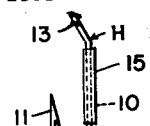
Fig. 2 is a side view of the fish hook of Fig. 1 having a coating of adhesive over a predetermined portion of the hook, such as the shank, an initial step in the method of this invention.

As illustrated in Figs. 1–4, all or only a portion of the shank 10 of the hook H may be coated by an adhesive layer 15, as in Fig. 2, it being understood that the thickness of the adhesive layer is exaggerated for the sake of clarity of illustration and that a greater or lesser portion of the hook may be coated than shown. This adhesive should be comparatively quick-drying, latex or rubber emulsions, spar varnish and alkyd resins being suitable. The adhesive may be brushed, sprayed or otherwise suitably applied only to that portion of the fish hook which is to be coated with the floc, and the fish hook is then placed in an air space in which the floc is suspended and an electrical charge applied thereto. Generally, this air space will be within a confining vessel or the like, into which a stream or jet of air is passed to maintain the floc in air suspension, although the floc may be permitted to drift downwardly through an air passage into which the charged hook is thrust or through which the charged hook passes. Preferably, the containing vessel for the air space is made in part of electrically conductive material, so that one terminal preferably the positive terminal, may be connected to the adhesive-coated fish hook and the other terminal, preferably the negative terminal, may be connected to the vessel. The potential difference between the terminals is sufficient to produce a charge on the floc, but not so high as to produce a spark or electrical discharge between the terminals. Voltages on the order of 10,000 to 50,000 volts, although at a very low amperage, or more or less in specific instances, may be used. With this potential difference, an electrostatic field between the adhesive coated hook and the air-space containing vessel is created, the floc tending to be negatively charged and thus attracted toward the positive metal hook.

Figure 3:
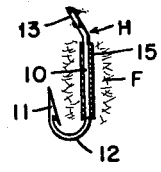
Fig. 3 is a diagrammatic illustration of the adhesive-prepared hook of Fig. 2, with a floc, or large number of relatively short fibers having a comparatively short diameter being attracted to the hook by electrostatic force.

As indicated diagrammatically in Fig. 3, the floc which is attracted to the hook will impinge upon the adhesive layer 15 and will be held there by the adhesive, while the floc which is attracted to the remainder or non-adhesive treated portions of the hook, will drop off the hook as soon as the electrical charge is discontinued. The actual production of artificial fishing flies, in accordance with this invention, has shown that the floc fibers tend to impinge against the adhesive from one end. This may possibly be due to a slight variation in the charge on each fiber of the floc, i. e. a slight potential difference between the ends of the individual fibers due to the tendency for an electron concentration at the end of each fiber furthest from the positively charged fish hook. Thus, the fiber being airborne, there will be an additional tendency for the more negatively charged end of the fiber to be drawn toward the positively charged fish hook. However, it is also possible that the fibers of the floc, during circulation about the fish hook by the air, will tend more often to contact the adhesive at one end, rather than intermediate the ends, and that the flow of electrons, such as through the fiber to the hook, tends to concentrate electrons at the opposite end of the fiber, causing the opposite end to be repelled and thereby causing the fiber to stand out transversely from the hook. In any event, irrespective of whether the result is due to a particular action of or interaction between the electrostatic field, the charged hook, the effect of the air or air currents and/or the position of the floc therein at any particular time, it has been found that the fibers of the floc predominantly extend substantially laterally from the hook.

The result is a hook such as shown in Fig. 4 and described previously, provided over a portion of its length, such as the shank or that portion to which the adhesive layer 15 of Fig. 2 was previously applied, with a relatively soft, fuzzy appearing portion in which the floc F or comparatively short fibers are attached to the hook in large numbers, the color of the floc coated portion being dependent upon the color or mixture of colors of the fibers employed. It will be evident that when the floc F is applied to different portions of the hook H at separate times, as described later, the color, size, length and other characteristics of the floc may be altered to produce different effects. As indicated previously, in the artificial fishing fly of Fig. 5, relatively long fibers 14 may be first attached to the shank by an adhesive, which is permitted to dry before another adhesive layer, such as layer 15, is applied thereto, after which the floc F is applied to the adhesive layer electrostatically, as described above. The long fibers 14 may, of course, have the same or a different color from the floc F, or be made of the same or a different material, depending upon the effect desired.

Figure 6:
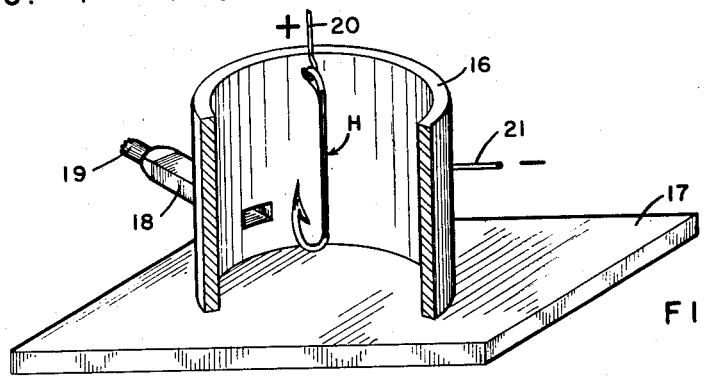
Fig. 6 is a three-dimensional view, partly in section and partly diagrammatic, illustrating a comparatively simple apparatus by which the method of this invention may be carried out.

In the apparatus of Fig. 6, a short section 16 of a steel or similarly electrically conductive metal cylinder is placed on an insulating board 17, the floc F placed inside the cylinder and moved about therein by an air jet from a nozzle 18, supplied through an air hose 19, or even simply by an air jet directed downwardly into the cylinder 16 from above. The hook H, coated with an adhesive layer as in Fig. 2 (the adhesive layer is not shown in Fig. 6 for clarity of illustration) may be mounted on an insulated lead 20, preferably connected to the positive terminal of the source of electricity, another lead 21 being preferably connected to the negative terminal, and a potential difference of between 10,000 and 50,000 volts is applied between the hook H and the cylinder 16. As a practical matter, the hook H may merely be dipped into the cylinder and then out again, since the deposition of the floc on the adhesive ordinarily takes but a matter of a few seconds, or a fraction of a second, and even when the operations are carried out by hand, it is a relatively simple matter to brush a layer of adhesive on the hook shank 10, and by using insulating gloves or the like, place the hook on the lead 20, dip it into the air space within cylinder 16, remove the hook, and place it on a rack to permit the adhesive to achieve final setting. The adhesive should, of course, dry at such a rate that it will not have dried completely by the time the hook is inserted in the floc chamber, but will complete drying shortly thereafter.

Figure 7:
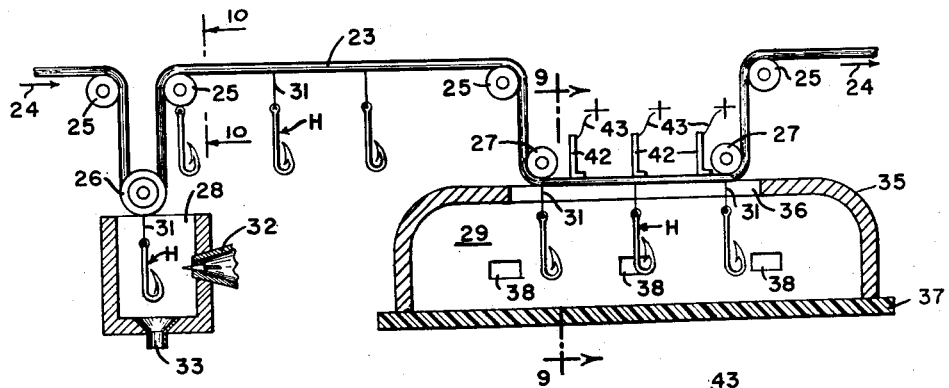
Fig. 7 is a side elevation, in longitudinal section, illustrating one type of apparatus suitable for carrying out the method of this invention on a quantity production basis.
Figure 8:
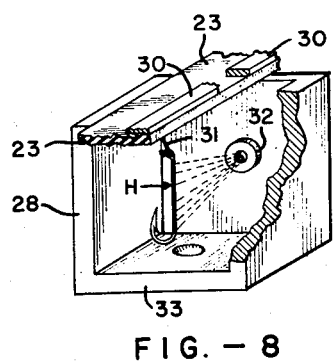
Fig. 8 is a perspective view of an adhesive applying chamber, broken away to show the interior construction and forming a part of the apparatus of Fig. 7.
Figure 9:
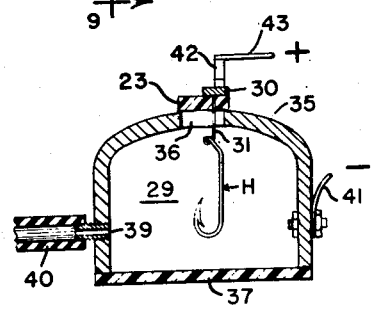
Fig. 9 is a vertical section taken along line 9—9 of Fig. 7.

The apparatus illustrated in Figs. 7–9 is designed for quantity production of artificial fishing flies of this invention, with less handling than in the case of the apparatus of Fig. 6, although it will be evident to those skilled in the art that many other types of apparatus may be used for quantity production purposes. As in Fig. 7, a continuous belt 23, preferably made of rubber or other suitable flexible insulating material passes in the direction of arrows 24, around rollers 25, 26 and 27, upper rollers 25 being provided for the purpose of guiding the belt to and from lower rollers 26 and 27, upper rollers 25 being provided for the purpose of guiding the belt to and from lower rollers 26 and 27. The lower rollers 26 guide each hook in turn into a spraying chamber 28 and lower rollers 27 guide the hooks through a floc chamber 29. As in Fig. 8, the belt 23 may be provided with a series of flexible metal conductive strips 30, preferably spaced from each other along belt 23 and each connected to a metal suspending hook 31, on each of which a fish hook H may be placed, as by hand or by machine prior to entering the spraying chamber 28. In the spraying chamber 28, an adhesive nozzle 32 may be operated in timed relation to the hooks, or continuously, so that the adhesive will be sprayed onto a predetermined portion of the fish hook H, such as the shank 10, as indicated by the dotted lines of Fig. 8. The spraying chamber 28 may be provided with a drain hole 33, for removal of excess adhesive, particularly when the nozzle 32 is operating continuously. It will be noted that, although the belt 23 is shown in Fig. 7 as passing around the lower roller 26, just above the spraying chamber 28, the belt 23 is flat in Fig. 9 in order to show the conducting strips 30 more clearly. However, the nozzle 32 may be placed in one side of the chamber, rather than at the end, and the hooks pass through slots in the end walls of the chamber, in which case the belt 23 may move in a plane across the top of the spraying chamber.

Figure 10:
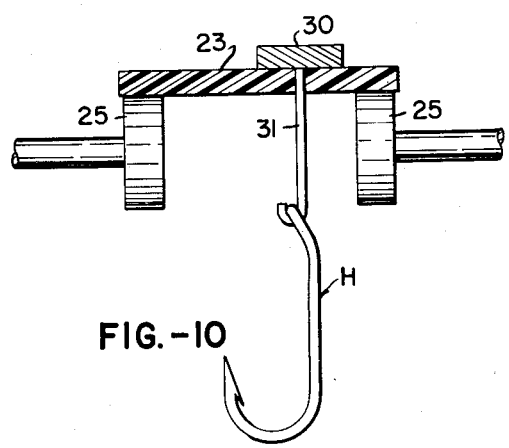
Fig. 10 is a fragmentary vertical section taken along line 10—10 of Fig. 7.

After leaving the spraying chamber 28, the hooks are conveyed to the floc chamber 29, it being noted that while the lower rollers 26 and 27, which engage the top of the belt, may extend the full width of the belt, the upper rollers 25 preferably do not extend as far as the suspending hooks 31, to avoid interference with the latter, as in Fig. 10. An upper housing 35 for floc chamber 29 is preferably made of metal, and may have an elongated slot 36 in the top thereof, through which the hooks H enter and leave. The floc chamber housing may again be placed or mounted on an insulating base 37, although the base may be conductive. The chamber 29 may have any desired shape, including that shown, and may be substantially closed at all times, the slot 36 being substantially closed by the belt 23. The air for circulation and air suspension of the floc within the chamber 29 may be supplied by one or more nozzles, such as non-circular nozzles 38 of Fig. 7 or circular nozzles 39 of Fig. 9, to which an air hose 40, preferably of rubber or other insulating material, may be attached. The housing 35, preferably made of electrically conductive metal, may be connected by a lead 41 with the negative terminal of the source of electricity.

During passage through the floc chamber 29, each of the hooks H may be charged through one or more contacts 42, preferably connected to the positive terminal of the source of electricity, as by wires 43, and adapted to engage each of the conducting strips 30 in turn. The contacts 42 are preferably spaced so that before one of the strips 30 has left the first contact, it will have reached the second, and so on, so that the desired electrical connection is made with each hook continuously during its passage through the floc chamber. It will be understood, of course, that other ways of supplying electricity to the hooks H and that other forms, shapes and sizes of floc chambers as well as air nozzles and air supply, may be utilized.

Figure 11:
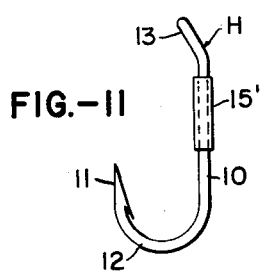
Fig. 11 is a side view of the fish hook of Fig. 1 having a first coating of adhesive over a part of the hook.
Figure 12:
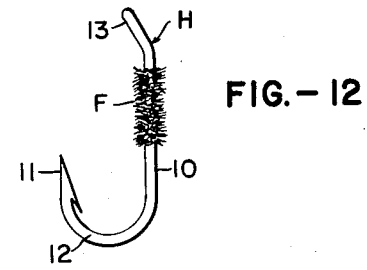
Fig. 12 is a side view of the hook of Fig. 11, after floc or fiber have engaged the adhesive and the adhesive has set.
Figure 13:
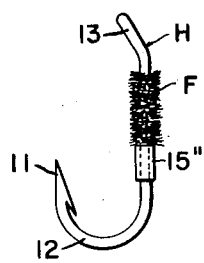
Fig. 13 is a side view of the hook of Fig. 12 having a second coating of adhesive over another part of the hook.
Figure 14:
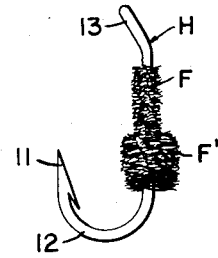
Fig. 14 is a side view of the hook of Fig. 13 after floc or fibers have engaged the second adhesive coating and the adhesive has set.

As illustrated in Figs. 11–14, floc of different characteristics may be applied to different parts of the hook H, such as by applying a first adhesive layer 15' of Fig. 11 to a part only of the shank 10 of the hook H, after which the hook H may be placed within the cylinder 16 of Fig. 6 so that the floc F of Fig. 12 will adhere to the adhesive layer 15' of Fig. 11. After the hook has been removed from the cylinder or chamber and the adhesive has set, a second adhesive layer 15" of Fig. 13 may be applied to another part of the hook, after which the hook H may be inserted within a similar chamber to which floc of a different characteristic may be supplied to the same chamber. After the floc having a different characteristic has engaged the second adhesive layer 15", the hook H may be removed from the chamber so that after the adhesive has set, the floc F' of Fig. 14 will adhere to the hook. Although the floc F' of Fig. 14 is indicated as being longer than floc F, it will be understood that the floc F and F' may differ in characteristics in other ways, such as in color, texture, type of material and the like, as well as in the length of the floc or fibers. It will also be understood that floc of different characteristics may be applied to different portions of a number of hooks by the apparatus of Figs. 7–9, as by adjusting nozzle 32 so that a first adhesive layer will be applied to only a part of the shank, such as layer 15' of Fig. 11. Floc, such as floc F of Fig. 12, may be supplied to chamber 29 while the hooks are passed therethrough in the manner previously described. Then, nozzle 32 of Fig. 8 may be adjusted so that a second layer or coating of adhesive will be applied to another part of the hook, such as layer 15" of Fig. 13, while floc of a different characteristic may be supplied to chamber 29, such as floc F' of Fig. 14. Of course, a second unit similar to the apparatus of Figs. 7–9 may be placed in series therewith or utilized consecutively, so that the first adhesive layer and the first floc will be applied in the first unit and the second adhesive layer and the second floc will be applied in the second unit.

From the foregoing, it will be evident that the artificial fishing fly and the method of producing the same, in accordance with this invention, each fulfill to a marked degree the requirements and objects hereinbefore set forth. The fly is, itself, slightly different in appearance than the conventional hand-tied fly, but this does not detract from the ability to catch fish with the fly. In fact, under some conditions more success has been had with the fly of this invention than with conventional hand-tied flies. The fly of this invention can, of course, be produced with a minimum of hand operations, and therefore the cost of producing the same can be reduced. Also, the materials used in the production of flies are comparatively inexpensive, particularly when compared with the sometimes highly expensive feathers or hair imported from other countries for use in making hand-tied flies. Furthermore, the color, length, diameter and material of the floc can be varied to achieve a wide variation in the coloring and appearance of the fly produced. By the relatively simple expedient of attaching to the hook by adhesive, long fibers extending longitudinally of and beyond the shank, variations in both the color and appearance of the fly can be achieved. As indicated previously, only a portion of the hook shank may be coated with adhesive and floc of one color or mixture of colors may be applied thereto, and then another portion of the shank may be coated with adhesive and floc of a different color or mixture of colors applied thereto. This may be repeated as desired and permits the production of bands, stripes and other variations in the fly.

As will also be evident, the method of this invention is relatively easy to carry out, and the necessary apparatus is comparatively inexpensive. Thus, primarily all that is necessary is merely a source of air and source of electricity, preferably direct current, at from 10,000 to 50,000 volts. The apparatus may be operated principally by hand, as in the relatively simple apparatus of Fig. 6, or may be adapted to quantity production, as in the case of the apparatus of Figs. 7–9. Also, the operation may be made entirely automatic, as by including a device for sorting the fish hooks H and placing them on the suspending hooks 31, and also a suitable device for removing the completed artificial flies from the suspending hooks 31.

It will be evident, of course, that various changes may be made in the apparatus adapted to carry out the method of this invention, other than those indicated. For instance, a circulatory system for the floc may be utilized, including a blower for blowing the floc through a passage through which the adhesive coated hooks are caused to pass, or permitting the floc to drop through a vertical passage through which the adhesive coated hooks pass, either down the passage or across the passage, together with a blower or other suitable means for picking up the floc and carrying it to the top of the floc passage. Thus, the air suspension of the floc may be by an air current or stream of air, or merely by permitting the floc to fall down through an air passage.

It will also be evident that other apparatus for carrying out the method of this invention may be utilized, and that various other changes may be made, both in the artificial fishing fly and in the method of this invention, all without departing from the spirit and scope thereof.

What is claimed is:

1. A fishing fly comprising a hook provided with a shank, a bill and an eye; and short fibers initially associated with the shank by electrostatic action and subsequently adhered to the shank by an adhesive.

2. A fishing fly, as defined in claim 1, wherein said fibers include fibers having different characteristics.

3. A fishing fly, as defined in claim 2, wherein said fibers include fibers of different colors.

4. A fishing fly, as defined in claim 2, wherein said fibers include fibers of different lengths.

5. The method of producing fishing flies, comprising the steps of coating the shank of a hook with an adhesive; placing said hook in a chamber; and electrostatically applying floc to said coated shank while in said chamber.

6. The method of producing a fishing fly, as defined in claim 5, which includes coating a first portion of said hook shank with adhesive and electrostatically applying floc to said first adhesive coated portion; then coating a second portion of said shank with adhesive and electrostatically applying to said second adhesive coated portion floc having a different characteristic than said first mentioned floc.

7. The method of producing a fishing fly, as defined in claim 5, wherein said chamber has at least one metal wall portion; and producing a potential difference between said hook and the metal portion of said chamber wall on the order of 10,000 to 50,000 volts so as to electrostatically apply said floc to said coated shank.

8. A method of producing fishing flies, comprising the steps of coating the shanks of a plurality of hooks with an adhesive; passing said hooks in succession through a chamber; and electrostatically applying floc to said coated shanks while in said chamber.

References Cited in the file of this patent

UNITED STATES PATENTS

| | | |
|---|---|---|
| 361,965 | Mills | Apr. 26, 1887 |
| 1,994,692 | Davenport | Mar. 19, 1935 |
| 2,034,832 | Raycraft | Mar. 24, 1936 |
| 2,043,609 | Derry | June 9, 1936 |
| 2,047,525 | Thode | July 14, 1936 |
| 2,093,585 | Woodhead et al. | Sept. 21, 1937 |
| 2,128,811 | Foster | Aug. 30, 1938 |
| 2,148,799 | Bilinski | Feb. 28, 1939 |
| 2,187,666 | Schumann | Jan. 16, 1940 |
| 2,236,241 | Wolfe | Mar. 25, 1941 |
| 2,511,117 | Loeb | June 13, 1950 |
| 2,532,961 | Steen | Dec. 5, 1950 |
| 2,596,457 | Wulff | May 13, 1952 |

FOREIGN PATENTS

| | | |
|---|---|---|
| 9,868 | Great Britain | 1915 |
| 501,597 | Great Britain | Mar. 1, 1939 |